US012637878B2

(12) United States Patent
Fisher et al.

(10) Patent No.: US 12,637,878 B2
(45) Date of Patent: May 26, 2026

(54) LOCKBOX WITH DOUBLE BEND SHACKLE

(71) Applicant: SentriLock, LLC, Cincinnati, OH (US)

(72) Inventors: Scott R. Fisher, West Chester, OH (US); Jeffrey W. Stone, Lebanon, OH (US); Alex R. Hulteen, Hilliard, OH (US); William P. Kefauver, Cincinnati, OH (US)

(73) Assignee: SentriLock, LLC, Cincinnati, OH (US)

( * ) Notice: Subject to any disclaimer, the term of this patent is extended or adjusted under 35 U.S.C. 154(b) by 16 days.

(21) Appl. No.: 18/775,376

(22) Filed: Jul. 17, 2024

(65) Prior Publication Data

US 2025/0034910 A1 Jan. 30, 2025

Related U.S. Application Data

(60) Provisional application No. 63/612,804, filed on Dec. 20, 2023, provisional application No. 63/528,599, filed on Jul. 24, 2023.

(51) Int. Cl.
*E05B 67/06* (2006.01)
*E05B 19/00* (2006.01)

(52) U.S. Cl.
CPC ........ *E05B 67/063* (2013.01); *E05B 19/0005* (2013.01)

(58) Field of Classification Search
CPC ............... E05B 67/063; E05B 19/0005; E05B 2067/066
USPC ............................................................... 70/53
See application file for complete search history.

(56) References Cited

U.S. PATENT DOCUMENTS

| | | | | | |
|---|---|---|---|---|---|
| 2 | A * | 7/1836 | Goulding | D01G 21/00 57/58.49 | |
| 436,834 | A * | 9/1890 | Mann | A62B 1/20 182/47 | |
| 621,742 | A * | 3/1899 | Blickensderfer | B41J 1/32 400/164.6 | |
| 957,705 | A * | 5/1910 | Nerhaft | E05B 67/24 70/53 | |
| 1,227,826 | A * | 5/1917 | Raff | E05B 37/025 70/52 | |
| 1,308,458 | A * | 7/1919 | Voight | E05B 39/04 70/53 | |
| 1,332,821 | A * | 3/1920 | Enos | E05B 37/025 70/53 | |

(Continued)

FOREIGN PATENT DOCUMENTS

| | | |
|---|---|---|
| CN | 308105321 | 12/2021 |
| SG | 30201906681 | 6/2019 |

(Continued)

OTHER PUBLICATIONS

ISA Int'l Search Report for PCT/US2024/038317, 19 pages, mailed on Nov. 25, 2024.

*Primary Examiner* — Nathan Cumar
(74) *Attorney, Agent, or Firm* — Frederick H. Gribbell; Russell F. Gribbell; William E. Crouse

(57) ABSTRACT

An electronic lockbox having a reversible shackle that exhibits two pairs of angled bends so that the lockbox can be mounted on door handles or door knobs, with the angled bends facing toward the rear of the lockbox, or by reversing the shackle, the angled bends can be arranged to be facing toward the front of the lockbox.

15 Claims, 18 Drawing Sheets

(56) References Cited

U.S. PATENT DOCUMENTS 1,420,578 A * 6/1922 Reichstein ............ E05B 37/025 70/53
1,666,453 A * 4/1928 Jakopets ............... E05B 37/025 70/330
3,695,067 A * 10/1972 Bays ....................... B60R 25/04 70/53
4,598,561 A * 7/1986 Girard .................. A63C 11/006 70/58
4,609,780 A * 9/1986 Clark ....................... G07C 9/27 235/382
4,918,951 A * 4/1990 Kavizky ............... E05B 67/063 70/53
5,253,496 A * 10/1993 Wang ...................... E05B 67/10 70/41
5,280,518 A * 1/1994 Danler ............... G07C 9/00817 340/5.23
5,475,993 A * 12/1995 Kuo ........................ E05B 71/00 70/53
5,654,696 A * 8/1997 Barrett ............... G07C 9/00309 340/5.5
5,705,991 A 1/1998 Kniffin
D392,540 S * 3/1998 McDaid ......................... D8/343
5,791,172 A * 8/1998 Deighton ............ E05B 19/0005 292/201
5,901,588 A * 5/1999 Frost ....................... E05B 67/06 70/58
D436,834 S 1/2001 Aichmann
D454,486 S * 3/2002 Striebel .......................... D8/499
6,427,973 B1 * 8/2002 Wagner ................... F16K 3/188 251/193
6,624,742 B1 9/2003 Romano
6,662,607 B2 * 12/2003 O'Neal ................. E05B 67/063 70/53
6,683,833 B2 * 1/2004 Dekker ................ G11B 7/0956
6,761,051 B1 * 7/2004 Tsai .................... E05B 47/0012 70/279.1
6,822,553 B1 * 11/2004 Henderson ............... G07C 9/27 70/278.1
6,842,105 B1 1/2005 Henderson
6,937,140 B1 * 8/2005 Outslay .................... G07C 9/27 340/5.73
7,177,819 B2 * 2/2007 Muncaster ................ G09F 9/00 340/5.73
D540,155 S * 4/2007 Czerewko ...................... D8/367
7,606,558 B2 10/2009 Despain
D603,685 S * 11/2009 Jackson ......................... D8/343
7,880,584 B2 * 2/2011 Larson ............... G07C 9/00309 340/5.5
8,040,218 B2 * 10/2011 Hays .................. G07C 9/00309 340/5.73
8,683,833 B2 4/2014 Marschalek
D723,353 S * 3/2015 Lin ................................ D8/330
9,336,637 B2 * 5/2016 Neil ................... G07C 9/00571
10,648,196 B2 * 5/2020 Neau ................... E05B 65/0075
11,274,467 B1 * 3/2022 Marton ................. E05B 67/383
11,352,817 B2 * 6/2022 Gengler ............. G07C 9/00944
11,598,120 B2 * 3/2023 Fisher ..................... E05B 67/22
11,655,653 B1 * 5/2023 Zhang ................... E05B 17/044 70/277
2002/0107010 A1 * 8/2002 Witte ................ G07C 9/00309 455/418
2004/0219903 A1 * 11/2004 Despain .............. H04W 12/082 455/410
2005/0207087 A1 9/2005 Fisher
2006/0283216 A1 12/2006 Marcelle
2007/0156758 A1 * 7/2007 Adiga .................... G06Q 50/16
2008/0246587 A1 * 10/2008 Fisher ................. E05B 19/0005 340/5.73
2009/0153291 A1 * 6/2009 Larson ............... G07C 9/00817 340/5.33
2009/0203562 A1 * 8/2009 Varadaraj .................. F17D 1/16 508/390
2009/0293562 A1 12/2009 Fisher
2010/0245107 A1 * 9/2010 Fulker ................... G06F 16/954 345/173
2011/0251876 A1 * 10/2011 Fisher ................ G06Q 30/0216 713/168
2011/0254659 A1 * 10/2011 Bowen ..................... G07C 9/37 340/5.6
2012/0068817 A1 * 3/2012 Fisher ................ G07C 9/00571 340/5.61
2012/0213362 A1 * 8/2012 Bliding .............. G07C 9/00309 340/5.61
2013/0214903 A1 * 8/2013 Kalous .................... E05B 65/48 340/5.61
2014/0236350 A1 * 8/2014 Woodard ................ G07F 9/001 700/237
2014/0266586 A1 * 9/2014 Fisher ................... H04W 12/06 340/5.61
2014/0359292 A1 * 12/2014 Kawamura ........... H04L 9/0866 713/168
2016/0119961 A1 4/2016 Hrabak
2019/0234113 A1 * 8/2019 Neau ..................... E05B 17/002
2019/0383057 A1 * 12/2019 Larson ................ E05B 47/0001
2020/0002973 A1 * 1/2020 Hill ..................... E05B 19/0005
2020/0071955 A1 * 3/2020 Binek ....................... E05C 3/10
2020/0071965 A1 3/2020 Zacchio
2020/0312067 A1 * 10/2020 Fisher ................. E05B 65/5246
2021/0027559 A1 * 1/2021 Fisher .................... G06Q 10/02
2021/0074103 A1 * 3/2021 Fisher ................ G07C 9/00904
2021/0324662 A1 * 10/2021 Ng .......................... E05B 67/06
2022/0180681 A1 * 6/2022 Ufkes ................ G07C 9/00309
2022/0284751 A1 * 9/2022 Fisher ................ G07C 9/00896
2022/0341222 A1 10/2022 Matthews

FOREIGN PATENT DOCUMENTS

WO 1993014571 7/1993
WO 2011065892 6/2011
WO 2016200814 12/2016

* cited by examiner

LOCKBOX WITH DOUBLE BEND SHACKLE

CROSS-REFERENCE TO RELATED APPLICATIONS

The present application claims priority to provisional patent application Ser. No. 63/528,599, titled "LOCKBOX WITH DOUBLE BEND SHACKLE," filed on Jul. 24, 2023, and also claims priority to provisional patent application Ser. No. 63/612,804, titled "LOCKBOX WITH DOUBLE BEND SHACKLE," filed on Dec. 20, 2023.

TECHNICAL FIELD

The technology disclosed herein relates generally to electronic lock equipment and is particularly directed to an electronic lockbox of the type which includes a shackle. Embodiments are specifically disclosed as an electronic lockbox having a reversible shackle that exhibits two pairs of angled bends so that the lockbox can be mounted on door handles or door knobs, with the angled bends facing toward the rear of the lockbox, or by reversing the shackle, the angled bends can be arranged to be facing toward the front of the lockbox.

STATEMENT REGARDING FEDERALLY SPONSORED RESEARCH OR DEVELOPMENT

None.

BACKGROUND

Electronic lockboxes historically have had U-shaped shackles that have a first leg that is essentially arranged to extend in a straight line, then the shackle curves about 180 degrees, and then extends back toward the lockbox in another straight line as a second leg. The two legs are received in openings in the lockbox housing.

Such a lockbox with a U-shaped shackle is described in a commonly-assigned United States Patent application titled "IMPROVED ELECTRONIC LOCKBOX," filed on Nov. 29, 2019, and having the Ser. No. 16/699,312, now U.S. Pat. No. 11,598,120 and having the title, "LATCHING APPARATUS FOR AN ELECTRONIC LOCKBOX."

SUMMARY

Accordingly, it is an advantage to provide an electronic lockbox having a shackle that exhibits two pairs of angled bends so that the lockbox can be mounted on door handles or door knobs. In one configuration, the first pair of angled bends directs the shackle toward the rear of the lockbox, while the second pair of angled bends re-directs the shackle back to its original upward-extending direction.

It is another advantage to provide an electronic lockbox having a shackle that exhibits two pairs of angled bends so that the lockbox can be mounted on door handles or door knobs. In a second configuration, the first pair of angled bends directs the shackle toward the front of the lockbox, while the second pair of angled bends re-directs the shackle back to its original upward-extending direction.

It is yet another advantage to provide an electronic lockbox having a reversible shackle that exhibits two pairs of angled bends so that the lockbox can be mounted on door handles or door knobs, with the angled bends facing toward the rear of the lockbox, or by reversing the shackle, the angled bends can be arranged to be facing toward the front of the lockbox.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an electronic lockbox is provided, which comprises: a main body that includes an exterior housing; a shackle that is installed in a surface of the exterior housing; the shackle extending through a first segment to a first angled bend, through a second segment to a second angled bend, through a third segment, then through a curved portion; through a fourth segment to a third angled bend, through a fifth segment to a fourth angled bend, and through a sixth segment that is proximal to surface of the exterior housing.

In accordance with another aspect, an electronic lockbox is provided, which comprises: a main body that includes an exterior housing; a shackle that is installed in a surface of the exterior housing; the shackle exhibiting a first leg that includes two angled bends, a U-shaped middle portion, and a second leg that includes two angled bends; wherein the shackle is reversible and may be installed in at least one of: a first orientation in which the angled bends aim the shackle towards a rear portion of the lockbox, and a second orientation in which the angled bends aim the shackle towards a front portion of the lockbox.

In accordance with yet another aspect, an electronic lockbox is provided, which comprises: a main body that includes an exterior housing; a shackle that is installed in first and second openings of the exterior housing; the shackle extending: from the first opening through a first segment to a first angled bend, through a second segment to a second angled bend, through a third segment, then through a curved portion; further through a fourth segment to a third angled bend, through a fifth segment to a fourth angled bend, and through a sixth segment that is extends to the second opening of the exterior housing.

In accordance with still another aspect, an electronic lockbox is provided, which comprises: a main body that includes an exterior housing; a shackle that is installed in a pair of openings in a first surface of the exterior housing; the shackle exhibiting: a first leg that includes two angled bends, a U-shaped middle portion, and a second leg that includes two angled bends; wherein the shackle is reversible and may be installed in at least one of: a first orientation in which the angled bends aim the shackle towards a rear portion of the electronic lockbox; and a second orientation in which the angled bends aim the shackle towards a front portion of the electronic lockbox.

In accordance with a further aspect, a method for installing an electronic lockbox onto an exterior entrance handle is provided, in which the method comprises: providing a door with an exterior entrance handle which includes: a grip portion that at least partially surrounds an open space; providing an electronic lockbox that comprises: a main body that includes an exterior housing; a shackle that is installed in a pair of openings in a first surface of the exterior housing, in which the shackle includes: a first leg that includes two angled bends, a U-shaped middle portion, and a second leg that includes two angled bends; detaching the shackle from the pair of openings of the exterior housing; installing the shackle around the grip portion of the exterior entrance handle, so that the U-shaped middle portion is in contact with both the grip portion and the door; and re-attaching the shackle to the pair of openings of the exterior housing, thereby mounting the electronic lockbox to the grip portion of the exterior entrance handle and allowing the electronic lockbox to hang substantially flush against the door.

In accordance with a yet further aspect, a method for installing an electronic lockbox onto a door knobset is provided, in which the method comprises: providing a door with a door knobset, the door knobset including: a door knob; a spindle; and a support cylinder; providing an electronic lockbox that comprises: a main body that includes an exterior housing; a shackle that is installed in a pair of openings in a first surface of the exterior housing, the shackle including: a first leg that includes two angled bends, a U-shaped middle portion, and a second leg that includes two angled bends; detaching the shackle from the surface of the exterior housing; installing the shackle around the spindle of the door knobset, so that the U-shaped middle portion is in contact with both the spindle; and re-attaching the shackle to the electronic lockbox, thereby allowing the electronic lockbox to hang substantially flush against the door.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
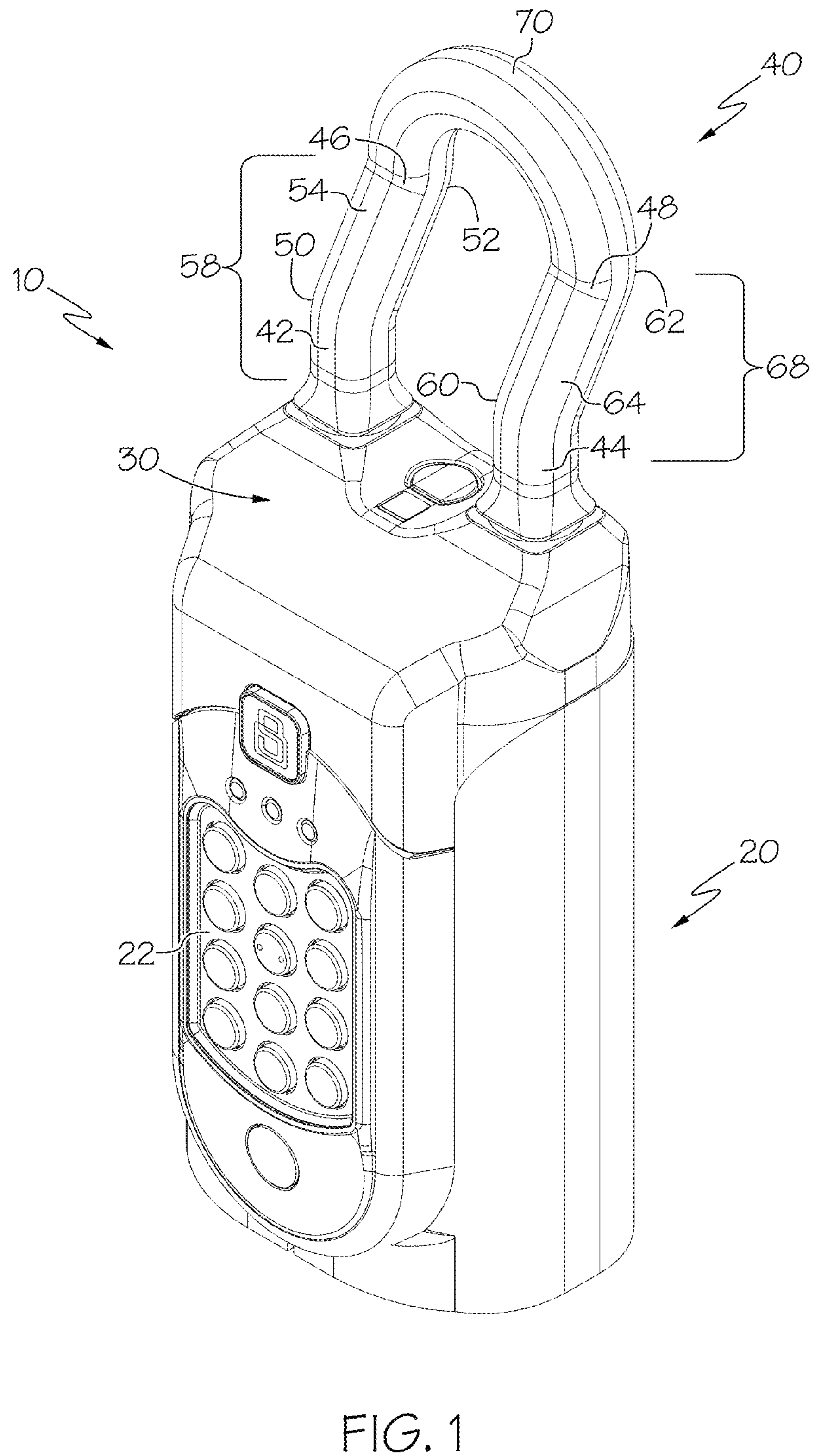
FIG. 1 is a top, front, and right side perspective view of a lockbox shackle, with the shackle installed into the lockbox at a first orientation, showing our new design.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

Figure 2:
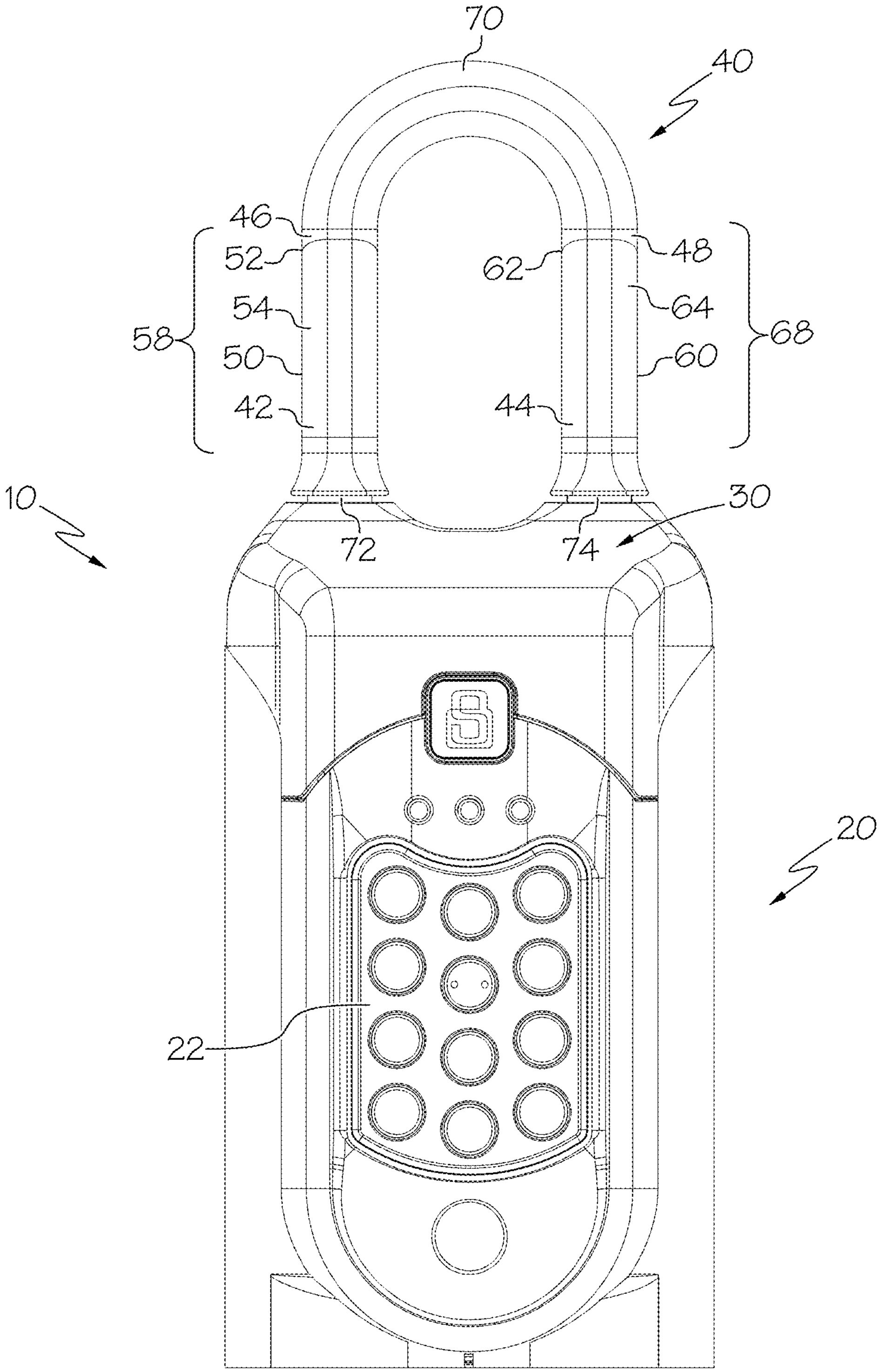
FIG. 2 is a front, elevational view of the lockbox shackle of FIG. 1.
Figure 3:
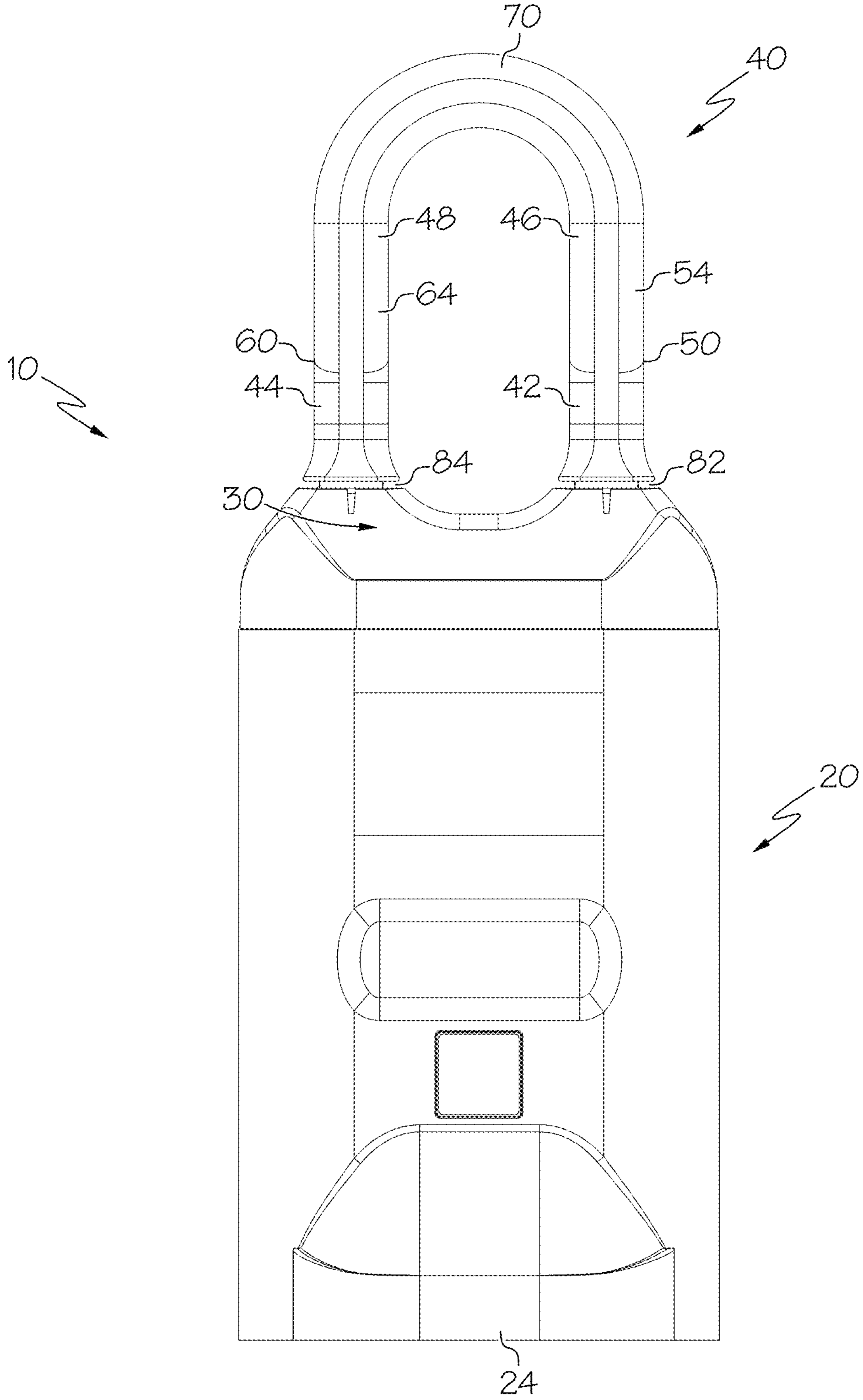
FIG. 3 is a rear, elevational view of the lockbox shackle of FIG. 1.
Figure 4:
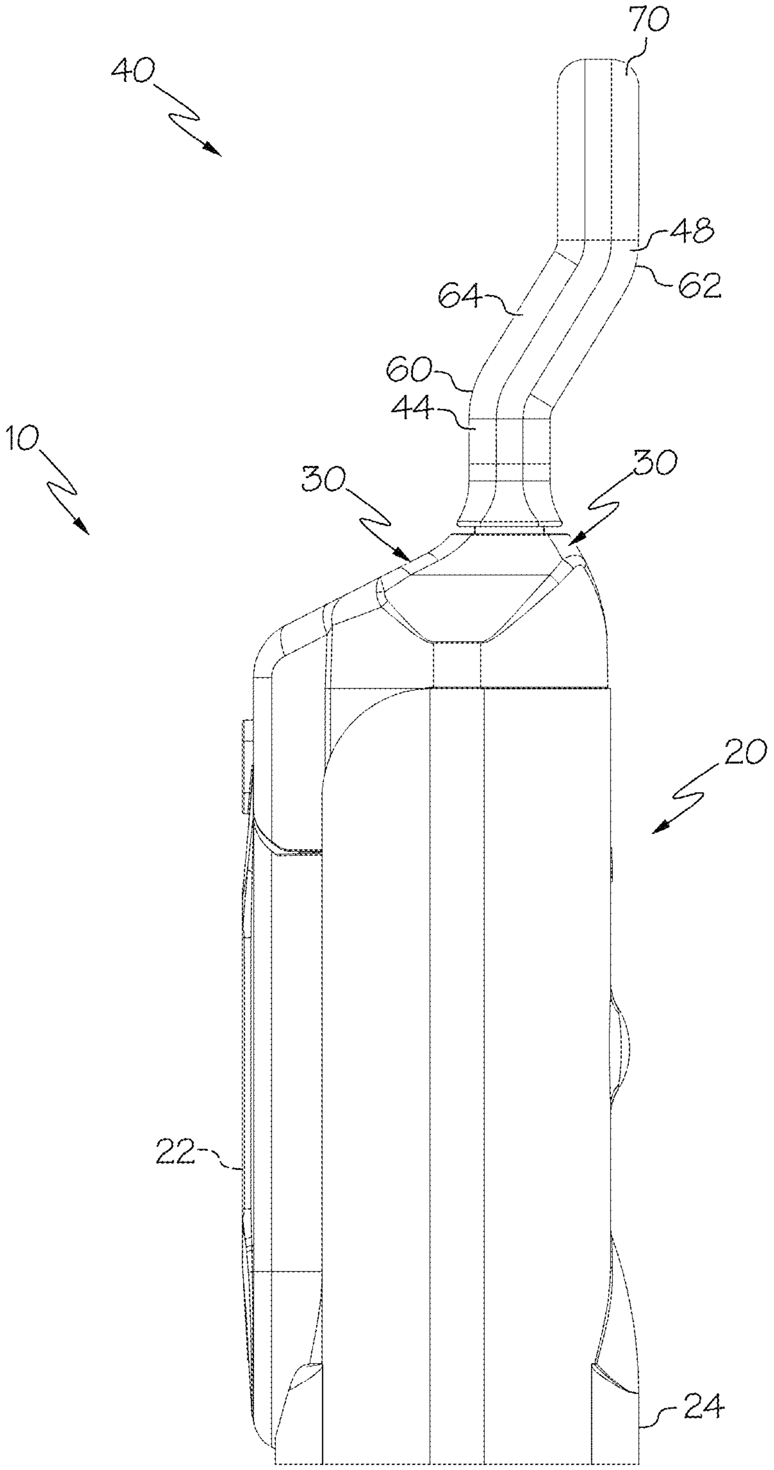
FIG. 4 is a right-hand side, elevational view of the lockbox shackle of FIG. 1.
Figure 5:
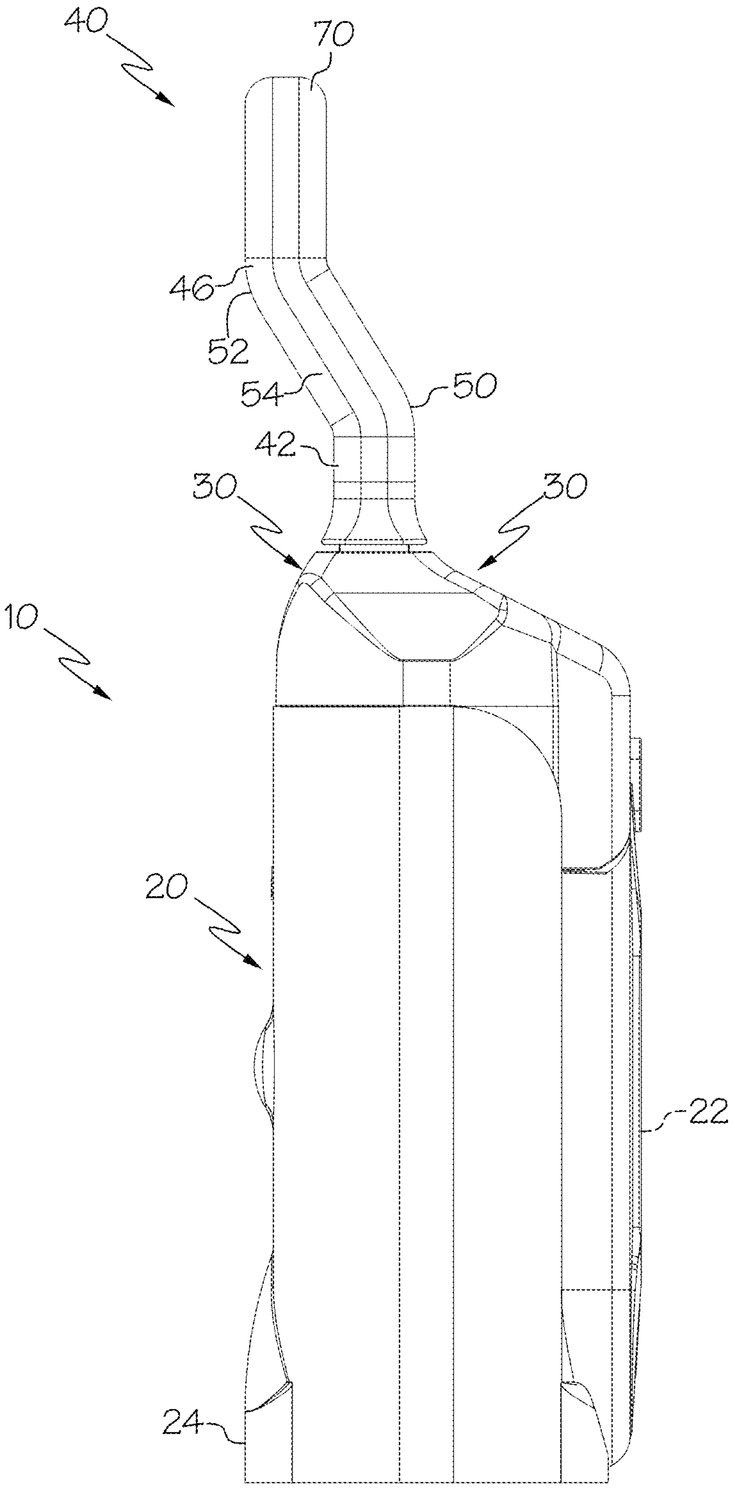
FIG. 5 is a left-hand side, elevational view of the lockbox shackle of FIG. 1.
Figure 6:
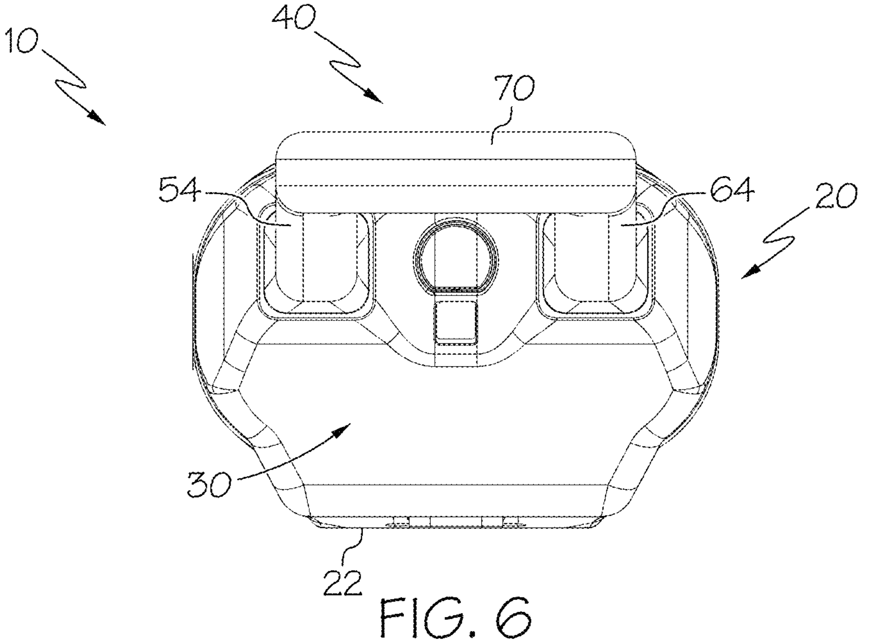
FIG. 6 is a top, plan view of the lockbox shackle of FIG. 1.

Referring now to FIG. 1, an electronic lockbox is illustrated, generally referred to by the reference numeral 10, with a shackle 40 in a first position. This may also be referred to herein as a "first embodiment" of this lockbox. Lockbox 10 includes certain standard features, such as a main body 20, which includes an outer housing or enclosure, a keypad 22 mounted on the front portion of the main body, and an upper or top portion 30, where the shackle is attached (or installed). As is typical is such lockboxes, the shackle 40 includes two extensions 72 and 74 (see FIG. 2) that protrude into openings 82 and 84 (see FIG. 3) in the upper portion 30, when the shackle is to be installed.

The shackle 40 is of a new design, and includes two legs 58 and 68 that extend above (in this view) the upper surface 30 of the lockbox 10, and those legs 58, 68 are joined together by a U-shaped portion 70, which is the uppermost portion (in this view) of the shackle 40. Such a U-shaped uppermost portion 70 is relatively standard for shackles used with both electrical and mechanical locks.

On the other hand, the legs 58 and 68 of shackle 40 are of a new configuration, in that each leg has two angled bends between the lowermost portions of the shackle 40—i.e., the lowermost portions that are visible in FIG. 1—and the uppermost U-shaped portion 70. These angled bends allow the new shackle 40 to be easily mounted on various types of door handles and door knobs, which are common mounting points for electronic lockboxes—and for mechanical lockboxes, for that matter.

The details of the legs 58 and 68 will now be described. Starting at the bottom portion of the left leg 58, there is a "first" segment 42, which can be described as being a lower left leg segment. Moving upward, the next feature is a lower (or "first") angled bend in the left leg at 50, above which the left leg further extends as a "second" segment 54. Moving upward further, the left leg arrives at another (or "second") angled bend, which may also be referred to as an upper angled bend in the left leg at 52. Moving upward yet further, the left leg extends as another (or "third") segment 46, which can also be referred to as an upper left leg segment, which then extends to the U-shaped uppermost portion 70 of the overall shackle.

In the illustrated embodiment of FIGS. 1-7, it can be seen that the two angled bends 50 and 52 are arranged in a reverse orientation, such that the first angle at 50 bends the shackle's left leg 58 "backwards"—i.e., toward the rear portion of the lockbox 10, as seen in these views—and then, the second angle at 52 bends the shackle's left leg 58 "forwards"—i.e., toward the front portion of the lockbox 10, as seen in these views. More precisely, the angles at 50 and 52 are virtually identical in size, so that the bottom (or "first" or "lower") left leg segment 42 extends upward (in these views) at essentially the same angle as the upper (or "third") left leg segment 46. In other words, as illustrated, the first and third left leg segments 42 and 46 are essentially parallel. This orientation can best be seen in FIG. 5, which is a left side elevational view.

It will be understood that the precise values of the angles that may be used for the angled bends 50 and 52 may be different values than illustrated, but nevertheless will still fall within the purview of the overall design concepts of this mechanical technology. Furthermore, the two angles of the bends 50 and 52 do not necessarily need to be equal, although that would mean that the first segment 42 would not end up being parallel to the third segment 46. However, that type of arrangement may prove beneficial for certain types of engineering applications using lockboxes.

As illustrated, the first and third left leg segments 42 and 46 are intended to be essentially parallel. This allows the shackle to be placed around an open-style door handle, while then allowing the bottom portion 20 of the lockbox (e.g., the enclosed main body) to hang down, but at an angle that allows easy access for authorized personnel, such as real estate agents, to access the keypad for the purpose of activating (and opening) the electronic lockbox 10. The shackle, thus arranged, may also be placed around most door knobs.

The above description of the left leg 58 is pertinent to the right leg 68, as follows. Starting at the bottom portion of the right leg 68, there is a "first" segment 44, which can be described as being a lower right leg segment. Moving upward, the next feature is a lower (or "first") angled bend in the right leg at 60, above which the right leg further extends as a "second" segment 64. Moving upward further, the right leg arrives at another (or "second") angled bend, which may also be referred to as an upper angled bend in the right leg at 62. Moving upward yet further, the right leg extends as another (or "third") segment 48, which can also be referred to as an upper right leg segment, which then extends to the U-shaped uppermost portion 70 of the overall shackle.

In the illustrated embodiment of FIGS. 1-7, it can be seen that the two angled bends 60 and 62 are arranged in a reverse orientation, such that the first angle at 60 bends the shackle's right leg 68 "backwards"—i.e., toward the rear portion of the lockbox 10, as seen in these views—and then, the second angle at 62 bends the shackle's right leg 68 "forwards"—i.e., toward the front portion of the lockbox 10, as seen in these views. More precisely, the angles at 60 and 62 are virtually identical in size, so that the bottom (or "first" or "lower") right leg segment 44 extends upward (in these views) at essentially the same angle as the upper (or "third") right leg segment 48. In other words, as illustrated, the first and third right leg segments 44 and 48 are essentially parallel. This orientation can best be seen in FIG. 4, which is a right side elevational view.

It will be understood that the precise values of the angles that may be used for the angled bends 60 and 62 may also be different values than illustrated, but nevertheless will still fall within the purview of the overall design concepts of this mechanical technology. Furthermore, the two angles of the bends 60 and 62 do not necessarily need to be equal, although that would mean that the first segment 44 would not end up being parallel to the third segment 48. However, that type of arrangement may prove beneficial for certain types of engineering applications using lockboxes.

As illustrated, the first and third left leg segments 44 and 48 are intended to be essentially parallel. This again allows the shackle to be placed around an open-style door handle, while then allowing the bottom portion 20 of the lockbox (e.g., the enclosed main body) to hang down, but at an angle that allows easy access for authorized personnel, such as real estate agents, to access the keypad for the purpose of activating (and opening) the electronic lockbox 10. The shackle, thus arranged, may also be placed around most door knobs.

Figure 7:
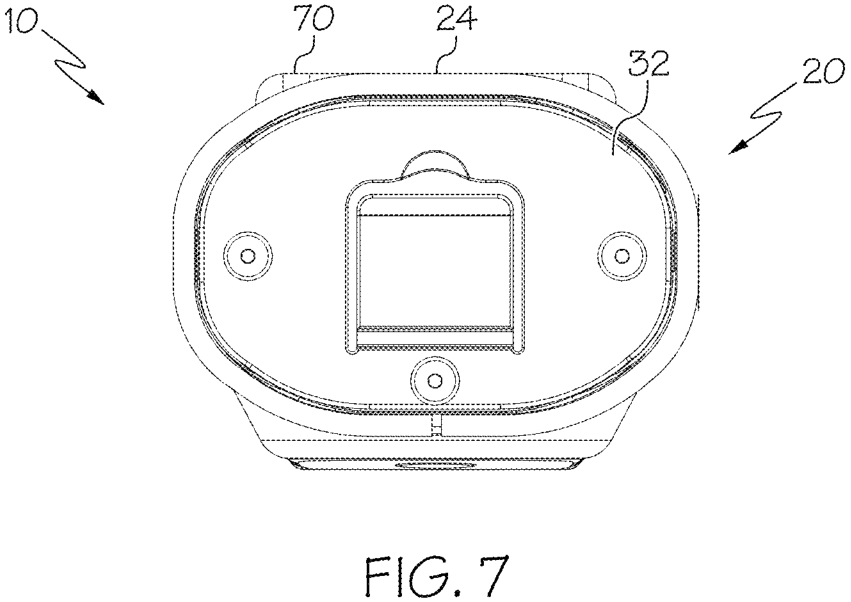
FIG. 7 is a bottom, plan view of the lockbox shackle of FIG. 1.

FIGS. 2 through 7 illustrate the same lockbox in various perspective angles, and the features described herein that pertain to the lockbox 10 in FIG. 1 also pertain to these views of FIGS. 2-7. Further, FIG. 7 is a bottom view, and illustrates a bottom surface 32 of the lockbox 10 that is not visible in the other views.

FIGS. 3-5 and 7 also illustrate a relatively small planar area 24 that is substantially flat, proximal to a bottom portion of the rear portion of the main body 20 of lockbox 10. This relatively small area 24 will lay flat against an outer surface of a door when the lockbox is used in certain orientations and modes of operation, as described hereinbelow, in reference to FIGS. 15-20. Furthermore, in FIG. 7 it can be seen that the small planar area 24 is co-linear with the 'back edge' of the upper shackle 70 (in this configuration of the lockbox shackle). The term 'back edge' has a meaning of the outer edge of the shackle 40 that faces toward the rear portion of the main body 20 (again, in this configuration of the lockbox shackle).

It will be further understood that the precise lengths of the various segments, or the ratios of the lengths of the various illustrated segments of the shackle 40, may be varied without departing from the principles of the mechanical technology presented in this technical disclosure.

Figure 8:
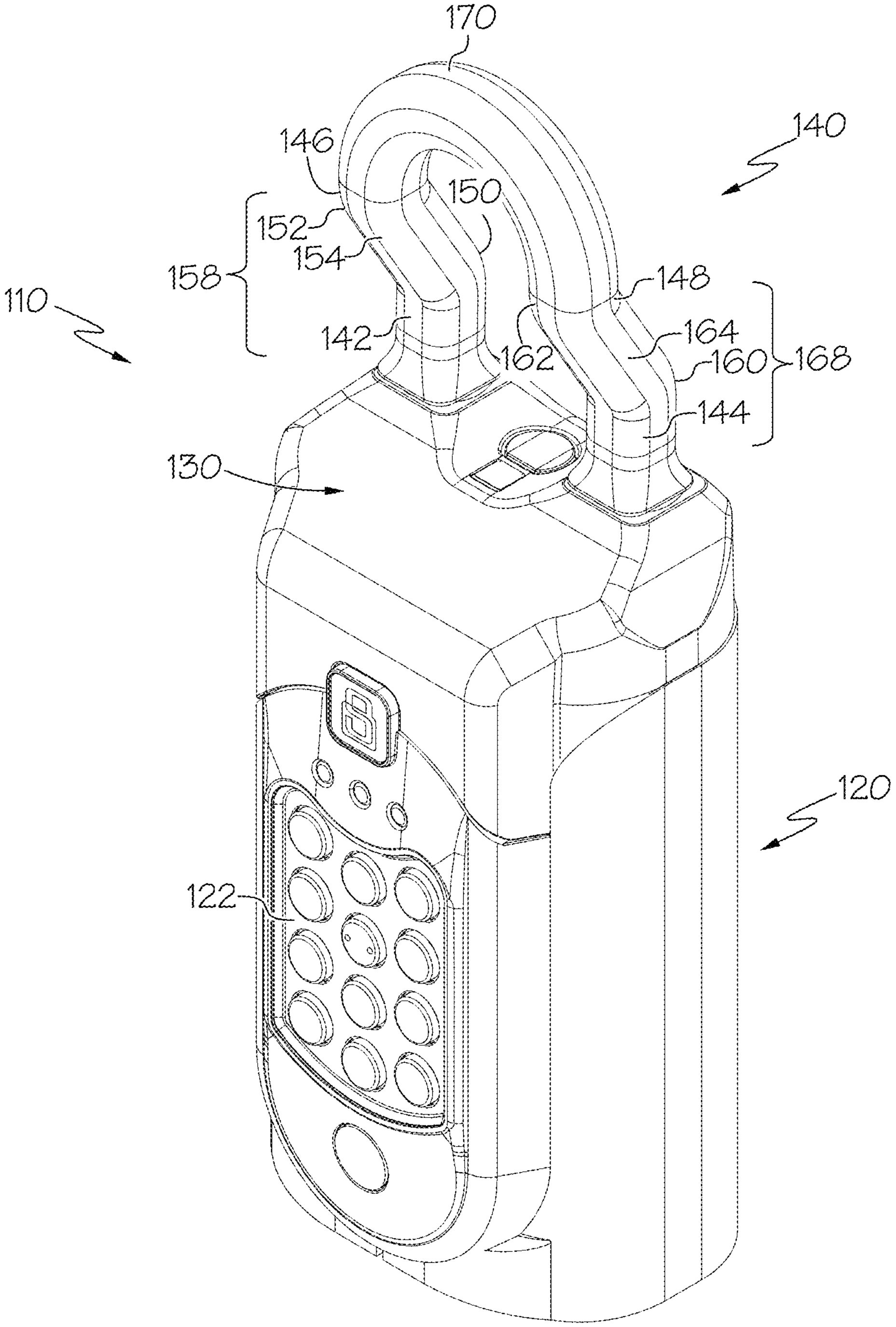
FIG. 8 is a top, front, and right side perspective view of the lockbox shackle of FIG. 1, with the shackle installed into the lockbox at a second (reversed) orientation.
Figure 9:
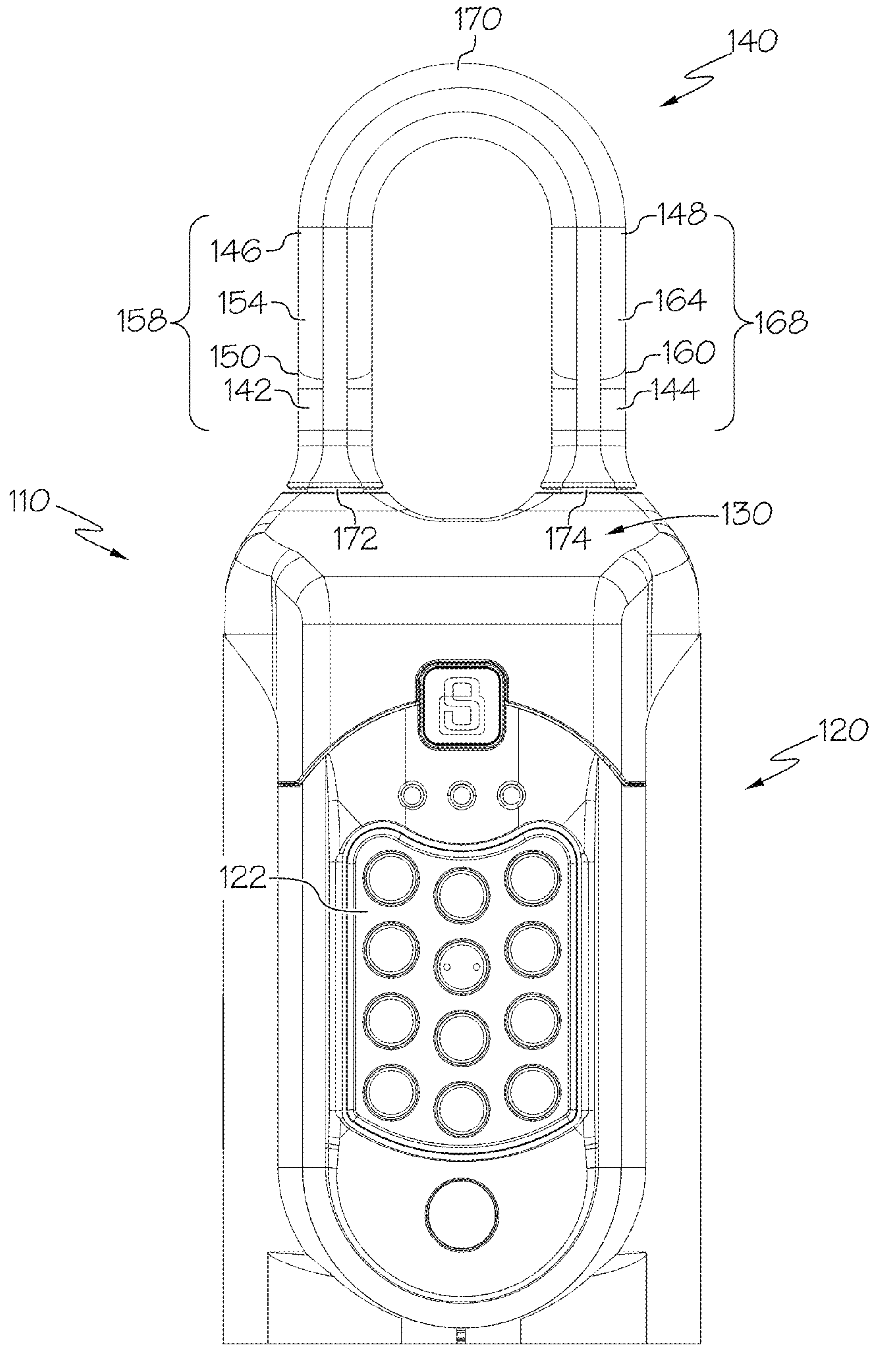
FIG. 9 is a front, elevational view of the lockbox shackle of FIG. 8.
Figure 10:
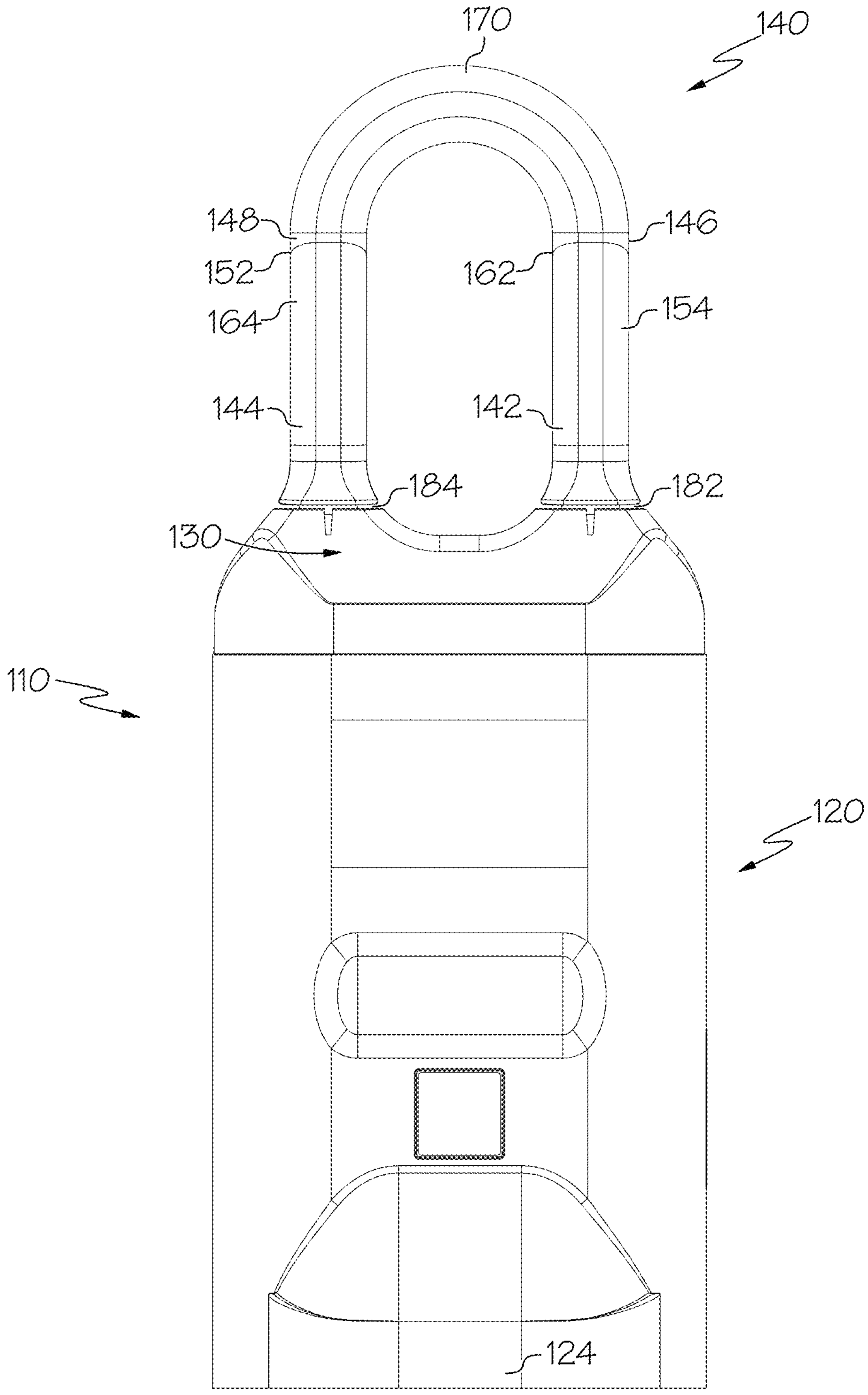
FIG. 10 is a rear, elevational view of the lockbox shackle of FIG. 8.
Figure 11:
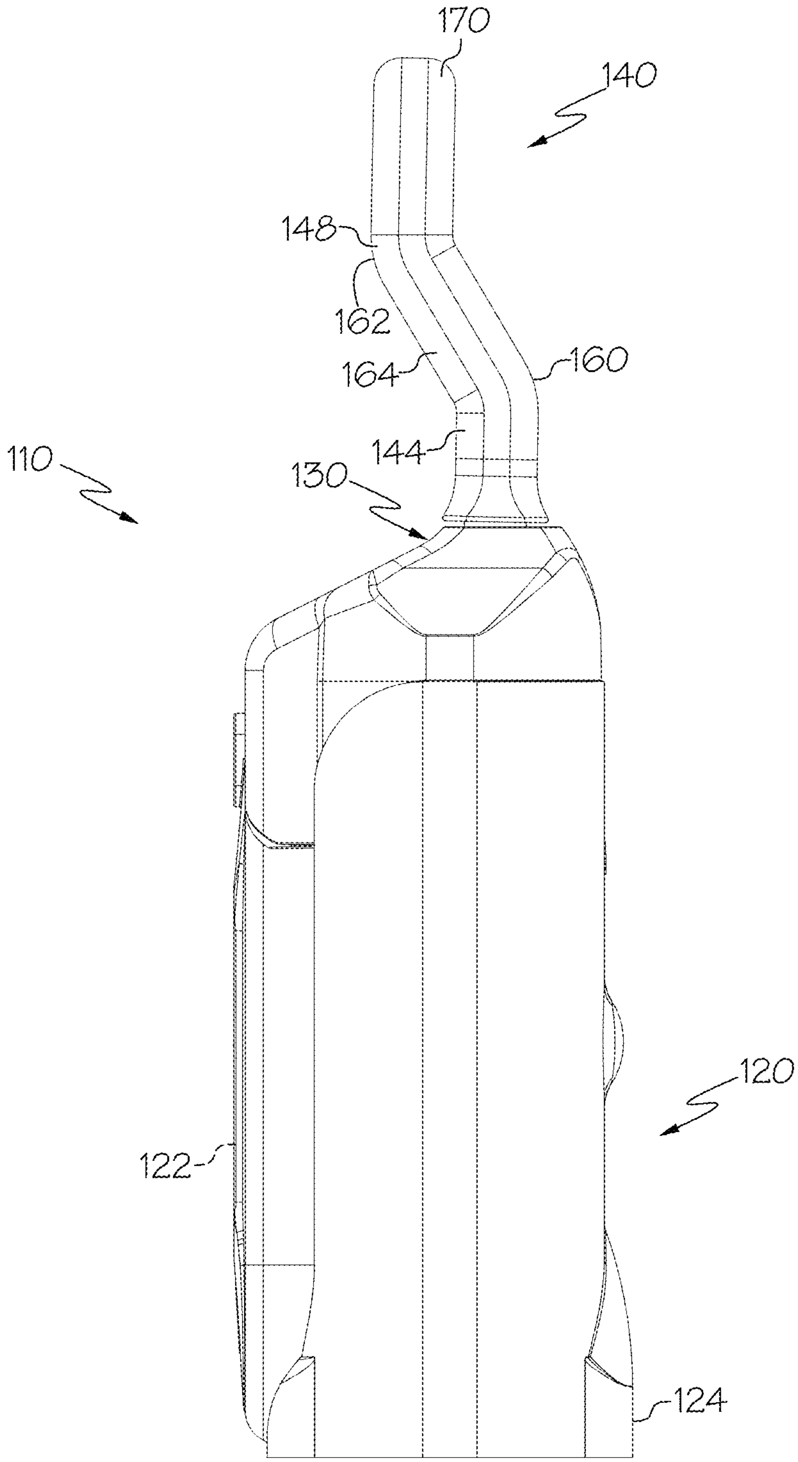
FIG. 11 is a right-hand side, elevational view of the lockbox shackle of FIG. 8.
Figure 12:
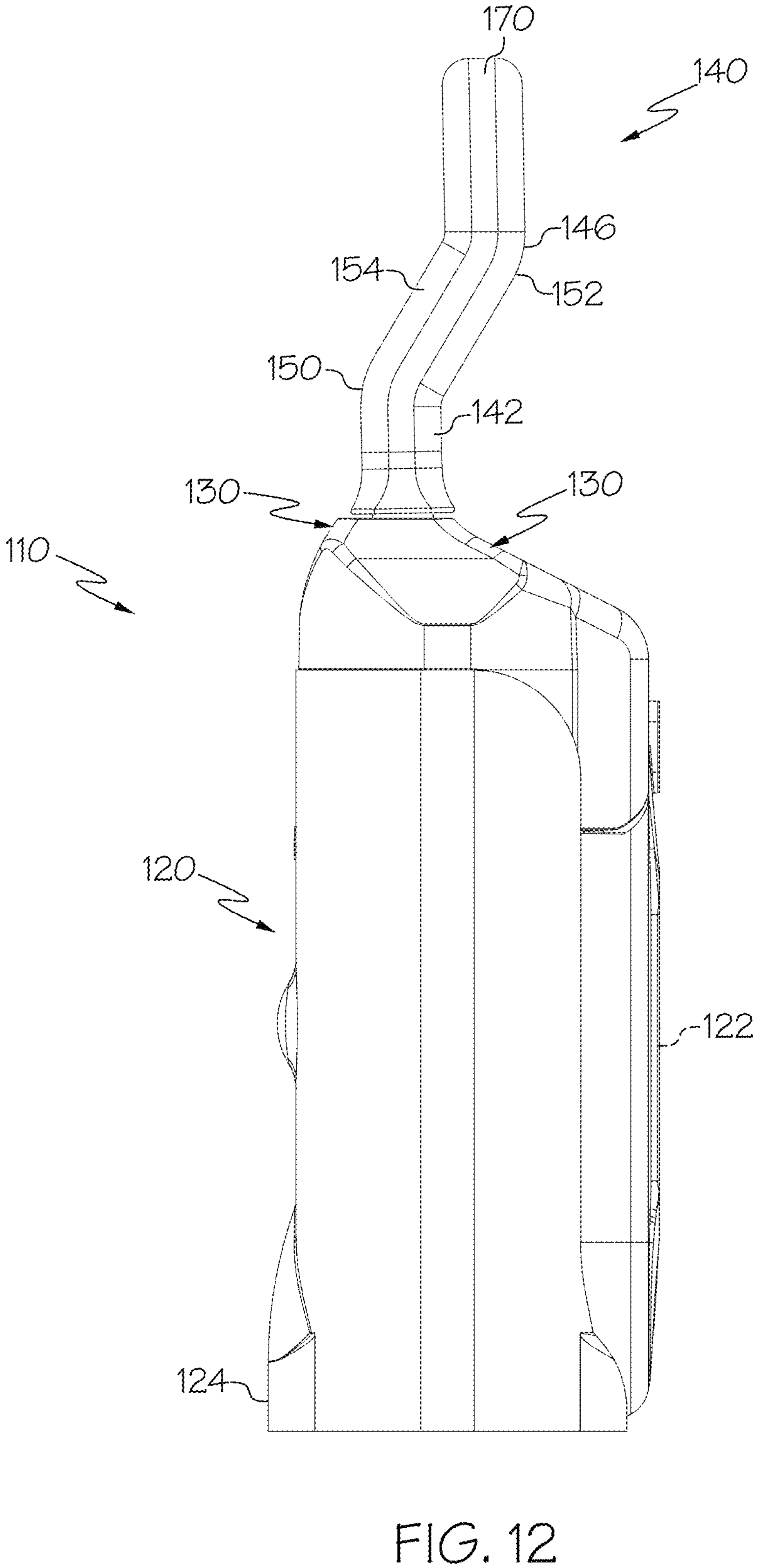
FIG. 12 is a left-hand side, elevational view of the lockbox shackle of FIG. 8.
Figure 13:
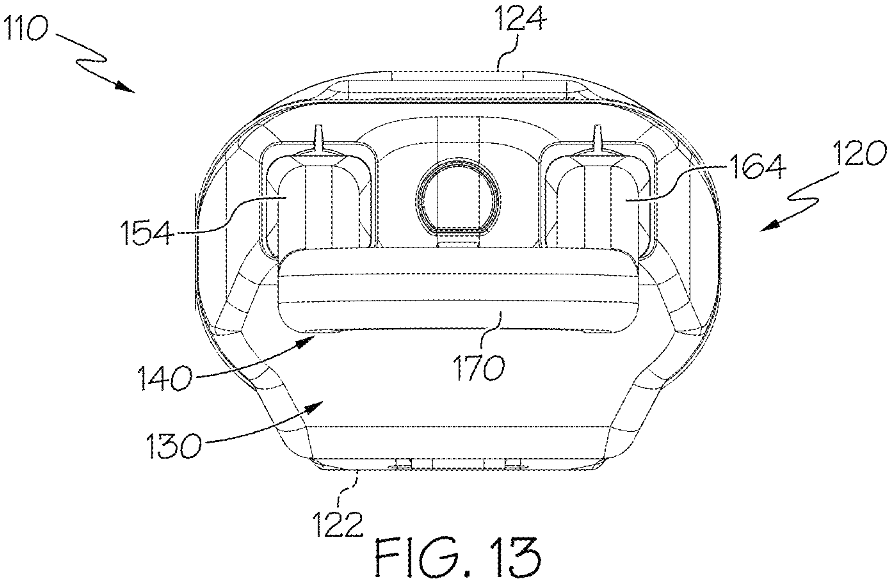
FIG. 13 is a top, plan view of the lockbox shackle of FIG. 8.

The shackle 40 of the electronic lockbox 10 is reversible. In other words, it may be installed in a first orientation as illustrated in FIG. 1, or the shackle may be turned by an angle of 180 degrees and then installed in a second (or "reverse") orientation, which is illustrated in FIG. 8. As can be seen, in this reverse orientation, the shackle extends "forward"—i.e., toward the front of the lockbox, rather than extending toward the rear of the lockbox that was illustrated in FIG. 1.

Referring now to FIG. 8, the overall electronic lockbox is generally referred to by the reference numeral 110. The following views of FIGS. 9-14 all show different perspective angles of this reverse orientation that is illustrated in FIG. 8. This reverse orientation may also be referred to herein as a "second embodiment," although the actual mechanical parts provided in FIGS. 8-14 are exactly the same as the mechanical parts that were provided in the "first embodiment" of FIGS. 1-7. The numbered parts in the views of FIGS. 8-14 have the number "1" added in front; for example, the lockbox main body 20 of FIG. 1 is referred to by the reference numeral 120 in FIG. 8. With that in mind, the following description is provided.

Referring now to FIG. 8, an electronic lockbox is illustrated, generally referred to by the reference numeral 110, with a shackle 140 in a second position. This may also be referred to herein as a "second embodiment" of this lockbox. Lockbox 110 includes certain standard features, such as a main body 120, which includes an outer housing or enclosure, a keypad 122 mounted on the front portion of the main body, and an upper or top portion 130, where the shackle is attached (or installed). As is typical is such lockboxes, the shackle 140 includes two extensions 172 and 174 (see FIG. 9) that protrude into openings 182 and 184 (see FIG. 10) in the upper portion 130, when the shackle is to be installed.

The shackle 140 is of a new design, and includes two legs 158 and 168 that extend above (in this view) the upper surface 130 of the lockbox 110, and those legs 158, 168 are joined together by a U-shaped portion 170, which is the uppermost portion (in this view) of the shackle 140. Such a U-shaped uppermost portion 170 is relatively standard for shackles used with both electrical and mechanical locks.

On the other hand, the legs 158 and 168 of shackle 140 are of a new configuration, in that each leg has two angled bends between the lowermost portions of the shackle 140—i.e., the lowermost portions that are visible in FIG. 1—and the uppermost U-shaped portion 170. These angled bends allow the new shackle 140 to be easily mounted on various types of door handles and door knobs, which are common mounting points for electronic lockboxes—and for mechanical lockboxes, for that matter.

The details of the legs 158 and 168 will now be described. Starting at the bottom portion of the left leg 158, there is a "first" segment 142, which can be described as being a lower left leg segment. Moving upward, the next feature is a lower (or "first") angled bend in the left leg at 150, above which the left leg further extends as a "second" segment 154. Moving upward further, the left leg arrives at another (or "second") angled bend, which may also be referred to as an upper angled bend in the left leg at 152. Moving upward yet further, the left leg extends as another (or "third") segment 146, which can also be referred to as an upper left leg segment, which then extends to the U-shaped uppermost portion 170 of the overall shackle.

In the illustrated embodiment of FIGS. 8-14, it can be seen that the two angled bends 150 and 152 are arranged in a reverse orientation, such that the first angle at 510 bends the shackle's left leg 158 "forwards"—i.e., toward the front portion of the lockbox 110, as seen in these views- and then, the second angle at 152 bends the shackle's left leg 158 "backwards"—i.e., toward the rear portion of the lockbox 110, as seen in these views. More precisely, the angles at 150 and 152 are virtually identical in size, so that the bottom (or "first" or "lower") left leg segment 142 extends upward (in these views) at essentially the same angle as the upper (or "third") left leg segment 146. In other words, as illustrated, the first and third left leg segments 142 and 146 are essentially parallel. This orientation can best be seen in FIG. 12, which is a left side elevational view.

It will be understood that the precise values of the angles that may be used for the angled bends 150 and 152 may be different values than illustrated, but nevertheless will still fall within the purview of the overall design concepts of this mechanical technology. Furthermore, the two angles of the bends 150 and 152 do not necessarily need to be equal, although that would mean that the first segment 142 would not end up being parallel to the third segment 146. However, that type of arrangement may prove beneficial for certain types of engineering applications using lockboxes.

As illustrated, the first and third left leg segments 142 and 146 are intended to be essentially parallel. This allows the shackle to be placed around an open-style door handle, while then allowing the bottom portion 120 of the lockbox (e.g., the enclosed main body) to hang down, but at an angle that allows easy access for authorized personnel, such as real estate agents, to access the keypad for the purpose of activating (and opening) the electronic lockbox 110. The shackle, thus arranged, may also be placed around most door knobs.

The above description of the left leg 158 is pertinent to the right leg 168, as follows. Starting at the bottom portion of the right leg 168, there is a "first" segment 144, which can be described as being a lower right leg segment. Moving upward, the next feature is a lower (or "first") angled bend in the right leg at 160, above which the right leg further extends as a "second" segment 164. Moving upward further, the right leg arrives at another (or "second") angled bend, which may also be referred to as an upper angled bend in the right leg at 162. Moving upward yet further, the right leg extends as another (or "third") segment 148, which can also be referred to as an upper right leg segment, which then extends to the U-shaped uppermost portion 170 of the overall shackle.

In the illustrated embodiment of FIGS. 8-14, it can be seen that the two angled bends 160 and 162 are arranged in a reverse orientation, such that the first angle at 160 bends the shackle's right leg 168 "forwards"—i.e., toward the front portion of the lockbox 110, as seen in these views—and then, the second angle at 162 bends the shackle's right leg 168 "backwards"—i.e., toward the rear portion of the lockbox 110, as seen in these views. More precisely, the angles at 160 and 162 are virtually identical in size, so that the bottom (or "first" or "lower") right leg segment 144 extends upward (in these views) at essentially the same angle as the upper (or "third") right leg segment 148. In other words, as illustrated, the first and third right leg segments 144 and 148 are essentially parallel. This orientation can best be seen in FIG. 11, which is a right side elevational view.

It will be understood that the precise values of the angles that may be used for the angled bends 160 and 162 may also be different values than illustrated, but nevertheless will still fall within the purview of the overall design concepts of this mechanical technology. Furthermore, the two angles of the bends 160 and 162 do not necessarily need to be equal, although that would mean that the first segment 144 would not end up being parallel to the third segment 148. However, that type of arrangement may prove beneficial for certain types of engineering applications using lockboxes.

As illustrated, the first and third left leg segments 144 and 148 are intended to be essentially parallel. This again allows the shackle to be placed around an open-style door handle (also known as an "exterior entrance handleset"), while then allowing the bottom portion 120 of the lockbox (e.g., the enclosed main body) to hang down, but at an angle that allows easy access for authorized personnel, such as real estate agents, to access the keypad for the purpose of activating (and opening) the electronic lockbox 110. In this reverse orientation, the shackle may allow the lockbox to be installed on door handles that extends much farther out—i.e., away from the main surface of a door, or perhaps to be installed on some other protruding object that is part of a building that is somewhat near (or proximal) to an access point of a building, or other important structure.

Figure 14:
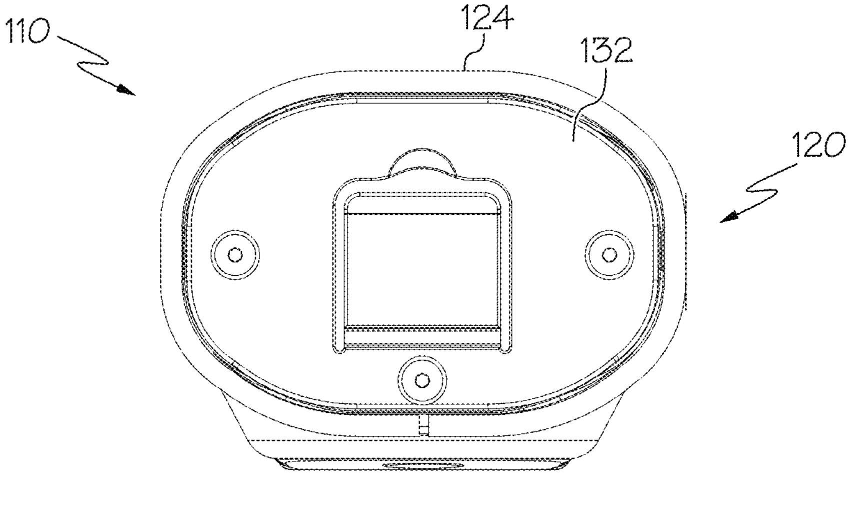
FIG. 14 is a bottom, plan view of the lockbox shackle of FIG. 8.

FIGS. 9 through 14 illustrate the same lockbox 110 in various perspective angles, and the features described herein that pertain to the lockbox 110 in FIG. 8 also pertain to these views of FIGS. 9-14. Further, FIG. 14 is a bottom view, and illustrates a bottom surface 132 of the lockbox 110 that is not visible in the other views.

FIGS. 10-12 and 14 also illustrate a relatively small planar area 124 that is substantially flat, proximal to a bottom portion of the rear portion of the main body 120 of lockbox 110. This relatively small area 124 will lay flat against an outer surface of a door when the lockbox is used in certain orientations and modes of operation, as described hereinbelow, in reference to FIGS. 15-20. (See, especially, FIG. 20.) Furthermore, in FIG. 14 it can be seen that the small planar area 124 is only a portion of the bottom support structure of the outer housing of the main body 120 of lockbox 110. In other words, most of the bottom support structure has a profile that is curved as seen in this bottom view, except for that relatively small planar area 124 and a similar, corresponding small planar area (not numbered) on the opposite side of the main body. This is also true for the first embodiment; its bottom view profile is similar (including its small area 24).

It will be understood that the 'laying flat' or 'laying flush' feature (discussed hereinbelow) of the lockboxes 10 and 110 is merely a desired feature of these embodiments, and that a continuously curved bottom 'back-side' profile of the lockbox main body's housing could be used instead; i.e., having a flat or planar area on the bottom 'back-side' of the lockbox is preferred, but it is not an absolute requirement for utilizing the main advantages of this mechanical design.

It will be further understood that the precise lengths of the various illustrated segments of the shackle 140, or the ratios of the lengths of the various illustrated segments, may be varied without departing from the principles of the mechanical technology presented in this technical disclosure.

Finally, it will be understood that the detailed features that were described above in reference to the "reverse orientation" embodiment of FIGS. 8-14 are exactly the same structures that were described in the original embodiment of FIGS. 1-7. For example, the following parts are identical: 10=110; 20=120; 22=122; 30=130; 32=132; 40=140; 70=170. Those were the 'easy' numbers to understand. The next following parts are also identical: 42=144; 44=142; 46=148; 48=146; 50=160; 52=162; 54=164; 58=168; 60=150; 62=152; 64=154; and 68=158. Thus, it can be seen that the two versions of the electronic lockbox, i.e., the first version of FIGS. 1-7 and the second version of FIGS. 8-14, are indeed the same product, only depicted in two different configurations.

Figure 15:
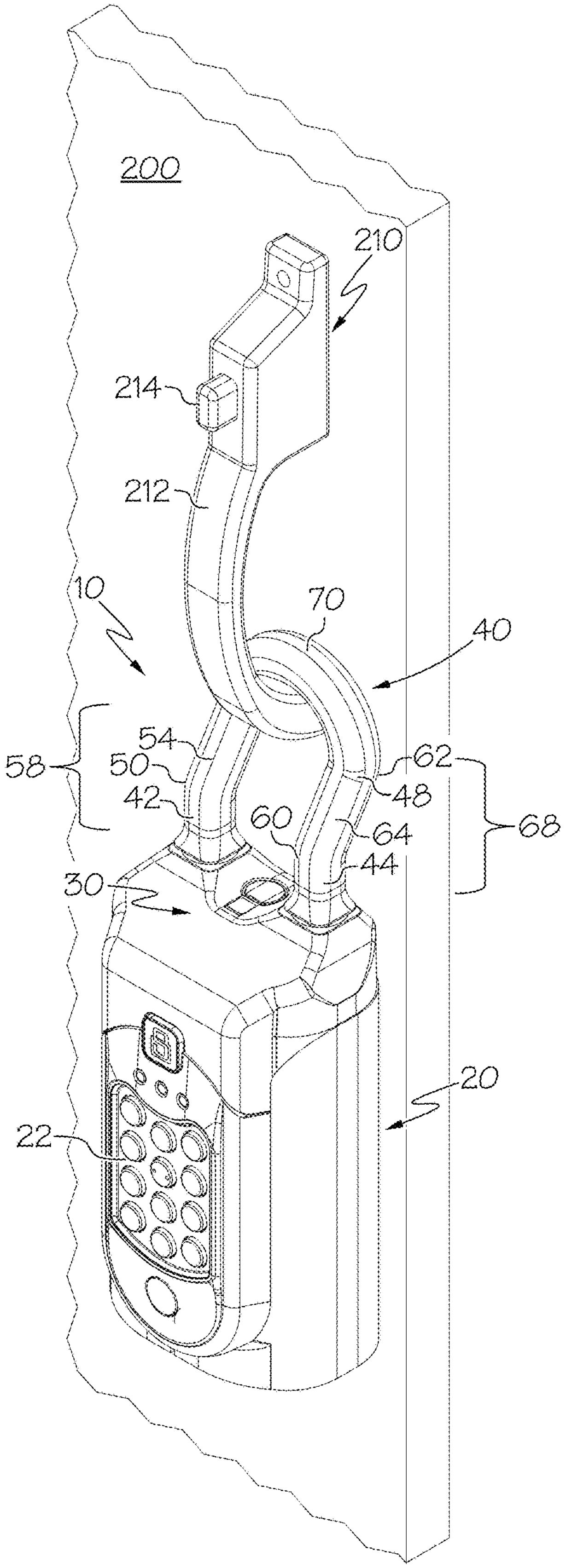
FIG. 15 is a top, front, and right side perspective view of the lockbox shackle of FIG. 1, with the shackle installed on the handle of an exterior entrance handleset.

Referring now to FIG. 15, the lockbox 10 is depicted installed on the handle 212 of an exterior entrance handleset 210. The exterior entrance handleset 210 is mounted to a door 200, and the handleset 210 exhibits a grip portion 212 (also sometimes referred to herein as a "handle portion," or merely a "handle") and a latch lever 214 (in this case, a 'push' opening latch). The U-shaped portion 70 of the shackle 40 rests at the base of the handle portion 212, and directly against the door 200. The double bends of the left leg 58 and the right leg 68 of the shackle 40 permit the main body 20 of lockbox 10 to rest directly against the door 200—i.e., the small area 24 of the bottom, rear portion of the main body lies 'flush' against the outer surface of the door 200. This feature provides important stability of the overall lockbox for an authorized user who is actuating the 'push-buttons' of the keypad 22 on the front portion of the lockbox main body 20. In other words, the lockbox will not 'squirm' around as the user is entering commands on the keypad 22.

Figure 16:
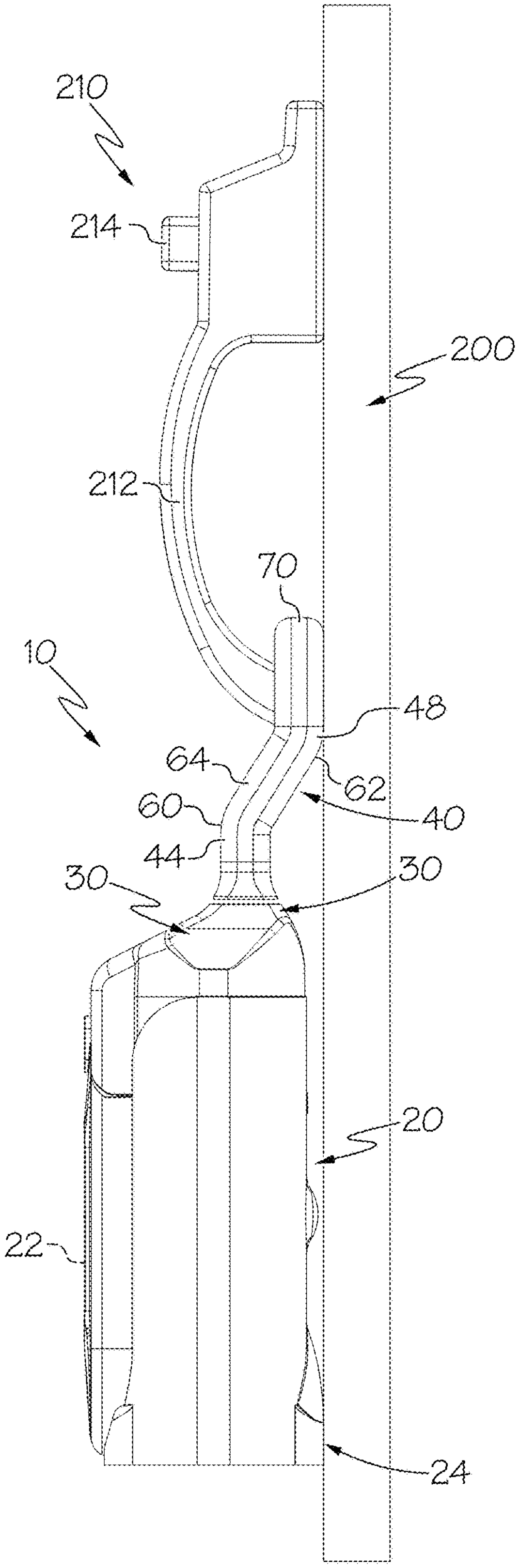
FIG. 16 is a right-hand side, elevational view of the lockbox shackle of FIG. 15.

In FIG. 16, the advantage of the double bends of the left leg 58 and the right leg 68 of the shackle 40 are illustrated, in which the lockbox 10 rests substantially flush to the door 200. Without these double leg bends, the lockbox 10 would rest at an angle to the door 200, similar to the lockbox illustrated in FIG. 18. Typically, during a real estate showing, an agent would access the lockbox to obtain the house key for the showing. Due to the typical odd angle, the agent may bump into the lockbox, scuffing the door, or unintentionally let go of the lockbox after unlocking it, also possibly scuffing the door due to the small angled area of the lockbox that actually contacts the door (again, see FIG. 18 as an example of such an angle).

With the lockbox 10 having the double leg bends as depicted in FIG. 16, these problems are minimized. When the agent needs to access the lockbox 10, he or she would be less likely to accidentally bump into the lockbox, since it seats flush against the door 200. Also, when the agent is accessing the lockbox, or closing it back up, the lockbox 10 will contact the door 200 at an increased surface area on the rear of the lockbox main body 20. This increased contact lessens the chance that the lockbox 10 scuffs the door 200 upon contact. And, further, as mentioned above, the lockbox is not likely to 'squirm' around as the user is entering commands on the keypad 22.

Figure 17:
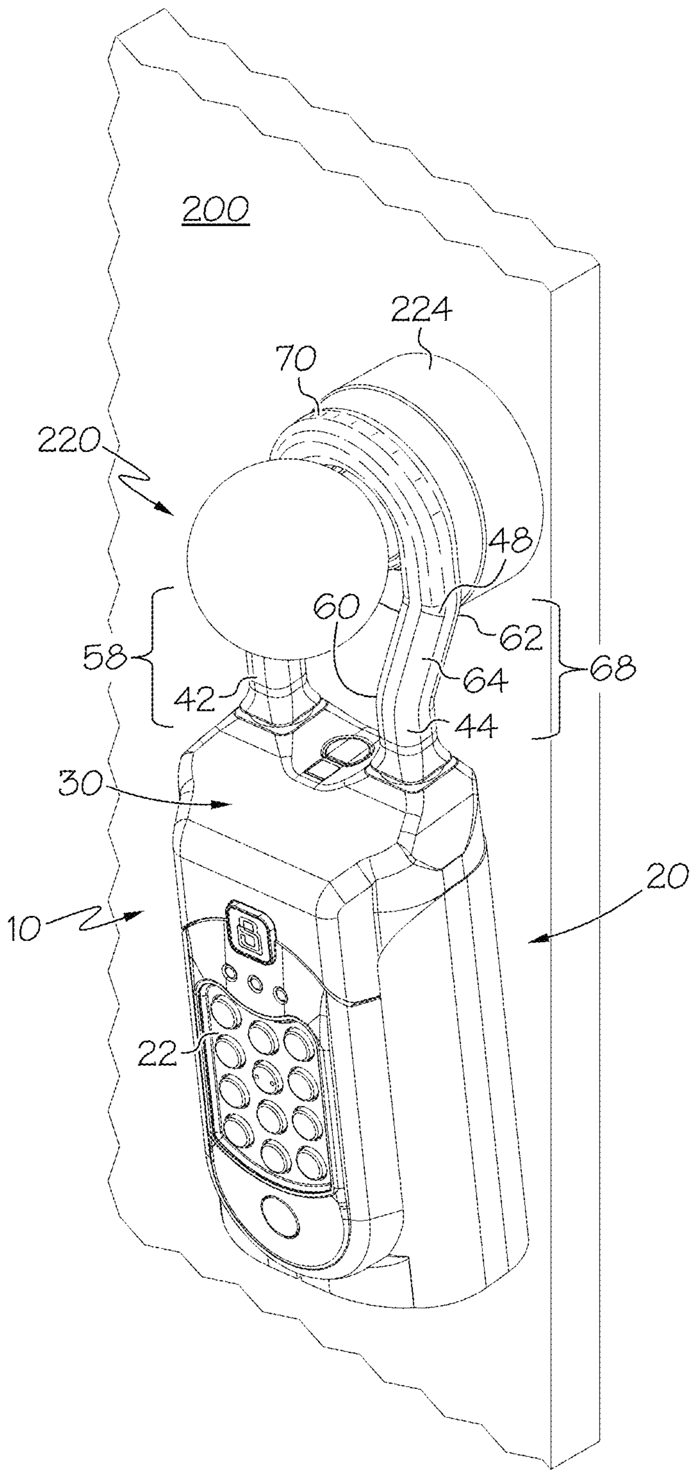
FIG. 17 is a top, front, and right side perspective view of the lockbox shackle of FIG. 1, with the shackle installed on a door knobset in a first orientation.
Figure 18:
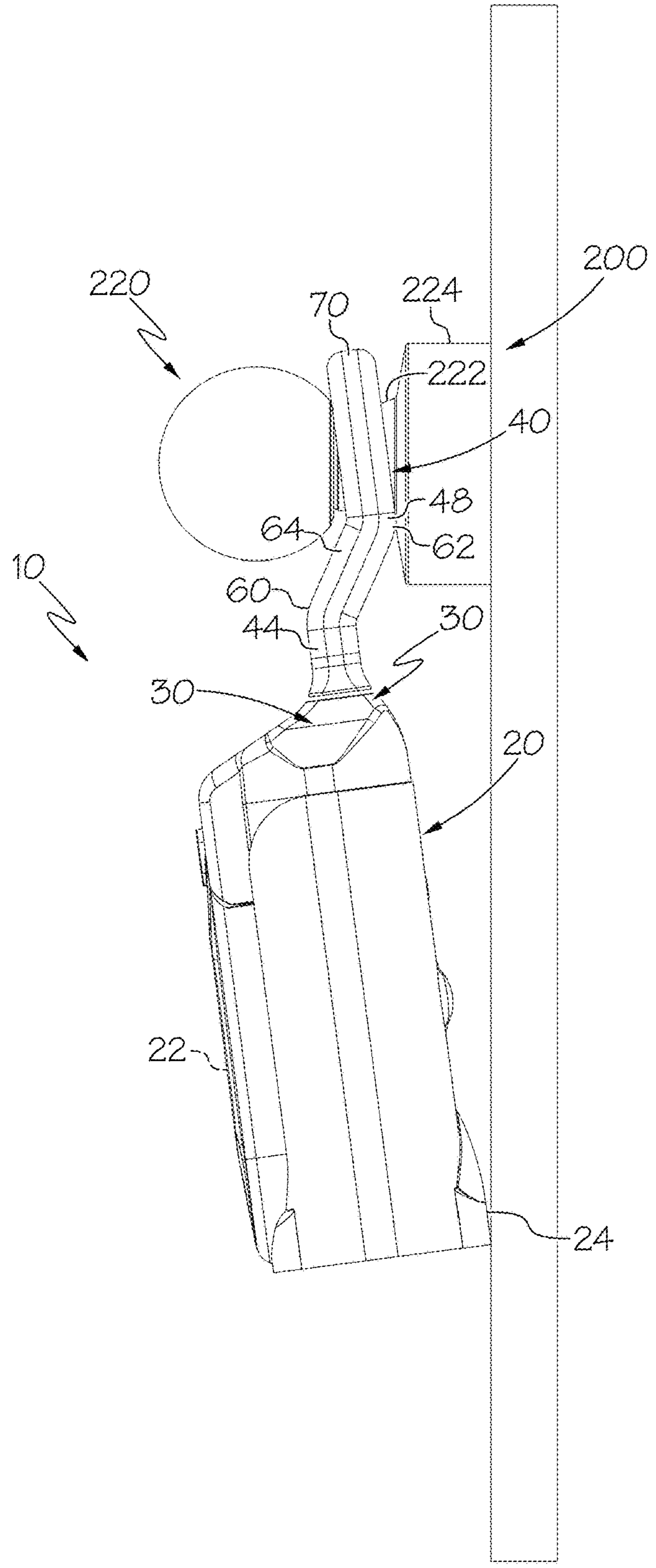
FIG. 18 is a right-hand side, elevational view of the lockbox shackle of FIG. 17.

Referring now to FIG. 17, the lockbox 10 is depicted installed on a door knobset 220. The door knobset 220 is installed on the door 200, and the U-shaped portion 70 of the shackle 40 rests on a spindle 222 of the knobset 220. Note that the knobset 220 also includes a support cylinder 224 that is mounted in the door itself, and the spindle at 222 is the smallest diameter portion of the knobset 220, where the shackle 40 will be located. As depicted in FIG. 18, the double bends of the left leg 58 and the right leg 68 of the shackle 40, along with the confining nature of the smaller-diameter spindle 222, cause the lockbox 10 to contact the door 200 at an angle that is non-flush. However, this "angled contact" can be mitigated by reversing the shackle orientation, as illustrated in FIGS. 19-20.

Figure 19:
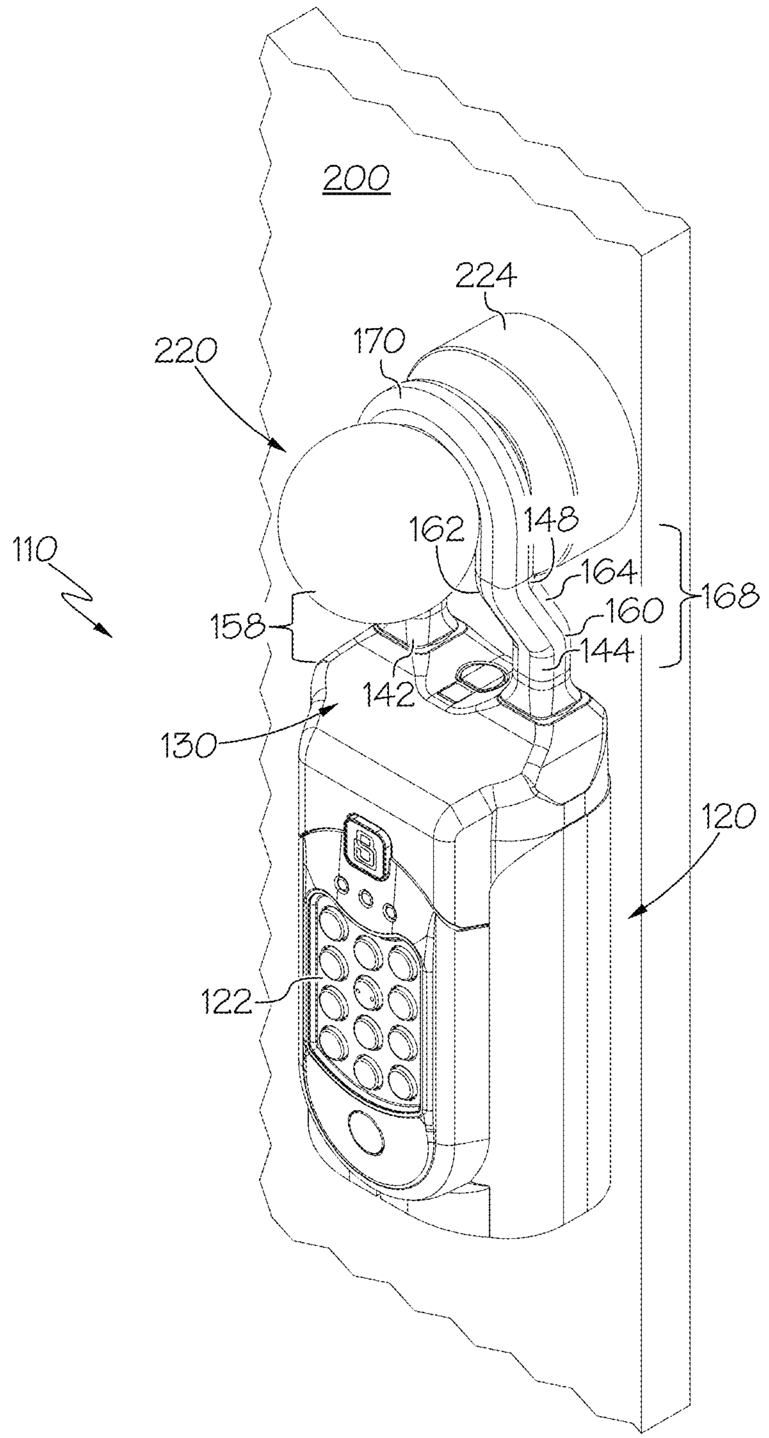
FIG. 19 is a top, front, and right side perspective view of the lockbox shackle of FIG. 8, with the shackle installed on a door knobset in a second (reversed) orientation.
Figure 20:
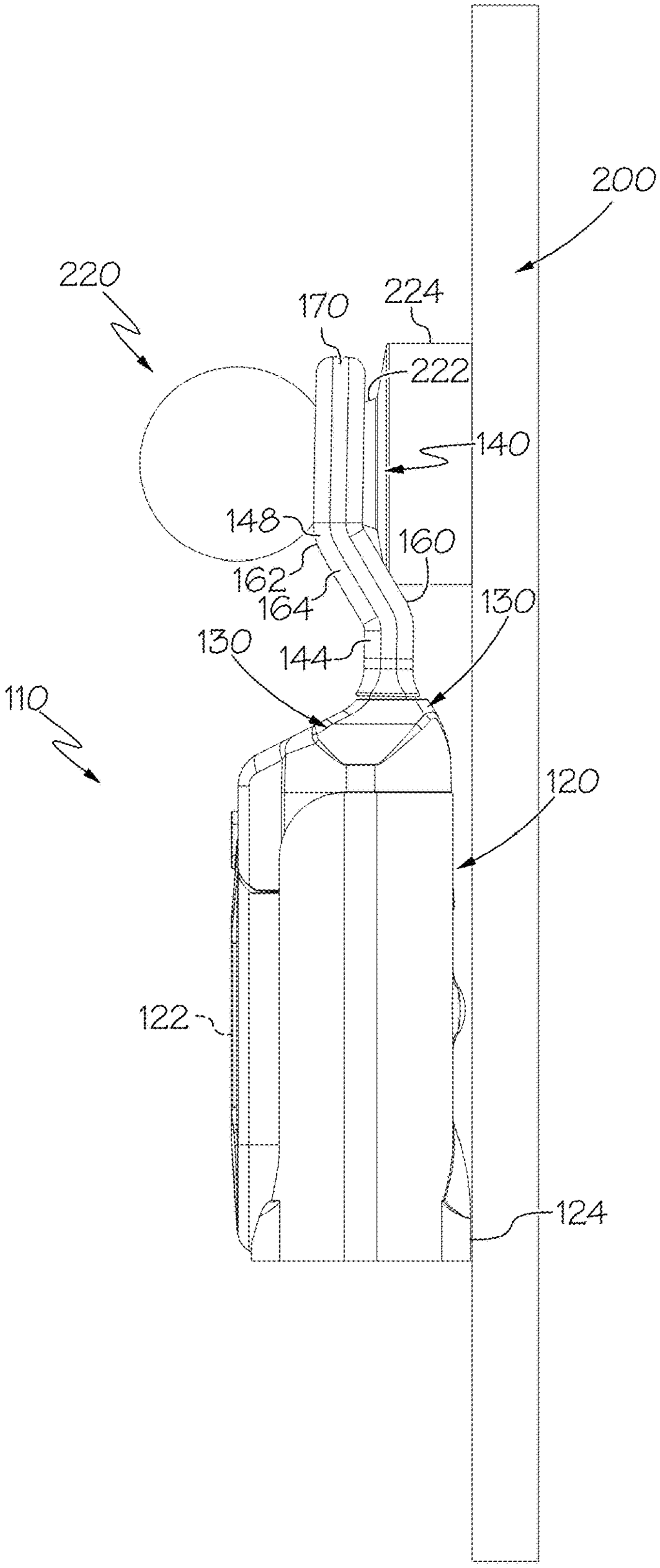
FIG. 20 is a right-hand side, elevational view of the lockbox shackle of FIG. 19.

In FIGS. 19 and 20, the lockbox 110 is depicted with the shackle 140 installed in the reverse orientation on the door knobset 220. The U-shaped portion 170 of shackle 140 rests on the spindle 222, but the reversed orientation of the shackle 140 and the reversed double bends of the right leg 158 and the left leg 168 allow the lockbox 110 to rest substantially flush against the door 200.

FIG. 20 illustrates the advantage of installing the lockbox 110 on the knob door handle 200 with the shackle 140 in the reverse orientation. In FIG. 20, the lockbox 110 rests substantially flush against the door 200. As can be seen in this view, the planar area 124 lies substantially flat (or flush) against the outer surface of the door 200. By locating the planar area 124 proximal to the bottom of the lockbox main body 120, a relatively maximum stability is achieved by creating a maximum moment arm by a structure of this size, which is more likely to prevent accidental, or unintentional, movement of the lockbox 110, while being used by an authorized user (e.g., while using the keypad 122).

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two (male and female) structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two (male and female) structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

Some additional information about "basic" lockbox embodiments, including advanced features, are more fully described in earlier patent documents by some of the same inventors, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. Pat. No. 8,451,088, issued May 28, 2013, for ELECTRONIC LOCK BOX WITH TRANSPONDER BASED COMMUNICATIONS; U.S. Pat. No. 8,164,419, issued Apr. 24, 2012, for ELECTRONIC LOCK BOX WITH TIME-RELATED DATA ENCRYPTION BASED ON USER-SELECTED PIN; U.S. Pat. No. 8,151,608, issued Apr. 10, 2012, for ELECTRONIC LOCK BOX WITH MECHANISM IMMOBILIZER FEATURES; U.S. Pat. No. 9,208,466, issued on Nov. 18, 2015, for ELECTRONIC LOCK BOX SYSTEM WITH INCENTIVIZED FEEDBACK; U.S. Pat. No. 8,593,252, issued Nov. 26, 2013, for ELECTRONIC LOCK BOX PROXIMITY ACCESS CONTROL; U.S. Pat. No. 8,912,884, issued Dec. 16, 2014, for ELECTRONIC KEY LOCKOUT CONTROL IN LOCKBOX SYSTEM; U.S. Pat. No. 9,053,629, issued on May 20, 2015, for CONTEXTUAL DATA DELIVERY TO MOBILE USERS RESPONSIVE TO ACCESS OF AN ELECTRONIC LOCKBOX; U.S. Pat. No. 9,478,083, issued on Oct. 5, 2016, for ELECTRONIC KEY LOCKOUT CONTROL IN LOCKBOX SYSTEM; U.S. Pat. No. 9,704, 315, issued on Jun. 21, 2017, for CONTEXTUAL DATA DELIVERY TO OTHER USERS AT AN ELECTRONIC LOCKBOX; U.S. Pat. No. 10,068,399, issued on Aug. 21, 2018, for CONTEXTUAL DATA DELIVERY TO OTHER USERS AT AN ELECTRONIC LOCKBOX; U.S. Pat. No. 10,026,250, issued on Jun. 27, 2018, for CONTEXTUAL DATA DELIVERY TO USERS AT A LOCKED PROPERTY; U.S. patent application No. 2020/0308870, published on Oct. 1, 2020, for IMPROVED ELECTRONIC LOCK- BOX; U.S. patent application No. 2020/0308868, published on Oct. 1, 2020, for IMPROVED ELECTRONIC LOCKBOX; U.S. patent application No. 2020/0308869, published on Oct. 1, 2020, for IMPROVED ELECTRONIC LOCKBOX; U.S. patent application No. 2020/0312067, published on Oct. 1, 2020, for IMPROVED ELECTRONIC LOCKBOX; and U.S. patent application No. 2020/0308871, published on Oct. 1, 2020, for IMPROVED ELECTRONIC LOCKBOX. These patent documents are incorporated by reference herein, in their entirety.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An electronic lockbox, comprising:
- a main body that includes an exterior housing;
- a shackle that is installed in first and second openings of the exterior housing;
- the shackle extending:
  - from the first opening through a first segment to a first angled bend, through a second segment to a second angled bend, through a third segment, then through a curved portion;
  - further through a fourth segment to a third angled bend, through a fifth segment to a fourth angled bend, and through a sixth segment that is extends to the second opening of the exterior housing, wherein:
- the first segment and the sixth segment define a first plane; and
- the second segment and the fifth segment define a second plane that is different from the first plane.

2. The electronic lockbox of claim 1, wherein:
- the first angled bend and the fourth angled bend substantially comprise the same angle.

3. The electronic lockbox of claim 2, wherein:
- the second angled bend and the third angled bend substantially comprise the same angle;
- the third segment and the fourth segment define a third plane; and
- the curved portion lies in the third plane.

4. A method for installing an electronic lockbox onto an exterior entrance handle, the method comprising:
- providing a door with an exterior entrance handle which includes:
  - a grip portion that at least partially surrounds an open space;
- providing an electronic lockbox that comprises:
  - a main body that includes an exterior housing;
  - a shackle that is installed in a pair of openings in a first surface of the exterior housing, in which the shackle includes:
    - a first leg that includes two angled bends,
    - a U-shaped middle portion, and
    - a second leg that includes two angled bends;
- detaching the shackle from the pair of openings of the exterior housing;
- installing the shackle around the grip portion of the exterior entrance handle, so that the U-shaped middle portion is in contact with both the grip portion and the door; and
- re-attaching the shackle to the pair of openings of the exterior housing, thereby mounting the electronic lockbox to the grip portion of the exterior entrance handle and allowing the electronic lockbox to hang substantially flush against the door, wherein:

the shackle is reversible and may be installed in at least one of:
- a first orientation in which the angled bends aim the shackle towards a rear portion of the electronic lockbox; and
- a second orientation in which the angled bends aim the shackle towards a front portion of the electronic lockbox.

5. The electronic lockbox of claim 3, wherein:
- the first plane and the third plane are parallel to one another.

6. The electronic lockbox of claim 1, wherein:
- the shackle is detachable from the first and second openings of the exterior housing, and is re-attachable in a reverse orientation to the first and second openings.

7. An electronic lockbox, comprising:
- a main body that includes an exterior housing;
- a shackle that is installed in a pair of openings in a first surface of the exterior housing;
- the shackle exhibiting:
  - a first leg that includes two angled bends,
  - a U-shaped middle portion, and
  - a second leg that includes two angled bends;
- wherein the shackle is reversible and may be installed in at least one of:
  - a first orientation in which the angled bends aim the shackle towards a rear portion of the electronic lockbox; and
  - a second orientation in which the angled bends aim the shackle towards a front portion of the electronic lockbox.

8. The electronic lockbox of claim 7, wherein:
- the exterior housing includes a second portion at a bottom rear portion of the electronic lockbox, in which the second portion includes a planar area;
- the U-shaped middle portion is in a first plane; and
- if the shackle is in the first orientation, the U-shaped middle portion and the second portion are co-planar.

9. The electronic lockbox of claim 8, wherein:
- if the shackle is in the second orientation, the U-shaped middle portion is in a second plane that is substantially parallel to the first plane when the shackle was in the first orientation.

10. The method of claim 4, wherein:
- when the shackle is installed in the first orientation, the electronic lockbox will hang substantially flush against the door; and when the shackle is installed in the second orientation, the electronic lockbox will hang at a non-flush angle against the door.

11. The method of claim 4, wherein, the electronic lockbox includes:

a front portion of the main body that faces away from the door after the electronic lockbox has been mounted to the grip portion of the exterior entrance handle;

a rear portion of the main body that faces toward the door after the electronic lockbox has been mounted to the grip portion of the exterior entrance handle; and a substantially planar surface proximal to a bottom portion of the rear portion of the main body, which is substantially co-planar with a surface of the shackle that touches the door.

12. A method for installing an electronic lockbox onto a door knobset, the method comprising:

providing a door with a door knobset, the door knobset including:

a door knob;

a spindle; and a support cylinder;

providing an electronic lockbox that comprises:

a main body that includes an exterior housing;

a shackle that is installed in a pair of openings in a first surface of the exterior housing, the shackle including:

a first leg that includes two angled bends, a U-shaped middle portion, and a second leg that includes two angled bends;

detaching the shackle from the surface of the exterior housing;

installing the shackle around the spindle of the door knobset, so that the U-shaped middle portion is in contact with the spindle; and re-attaching the shackle to the electronic lockbox, thereby allowing the electronic lockbox to hang substantially flush against the door, wherein:

the two angled bends of the first leg aim the shackle towards a rear portion of the electronic lockbox.

13. The method of claim 12, wherein:

the shackle is reversible and may be installed in at least one of:

a first orientation in which the angled bends aim the shackle towards a rear portion of the main body; and a second orientation in which the angled bends aim the shackle towards a front portion of the main body.

14. The method of claim 13, wherein:

when the shackle is installed in the second orientation, the electronic lockbox will hang substantially flush against the door; and when the shackle is installed in the first orientation, the electronic lockbox will hang at a non-flush angle against the door.

15. The method of claim 14, wherein:

if the shackle is installed in the second orientation, a substantially planar surface proximal to a bottom portion of the rear portion of the main body will contact the door at an angle that is substantially parallel to an outer surface of the door.

* * * * *